(No Model.)
A. CLEMONS.
CURTAIN ROLLER BRACKET.
No. 267,403. Patented Nov. 14, 1882.
Fig. 1.
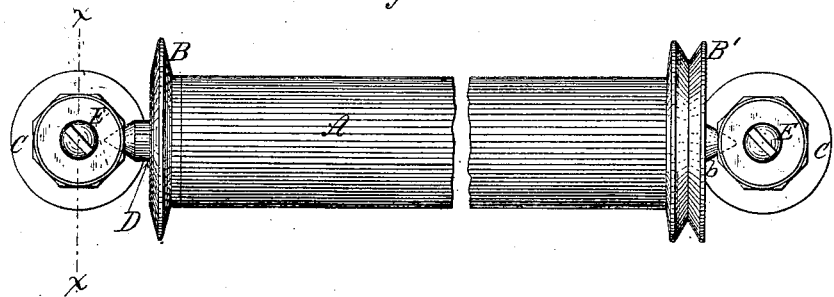
Fig. 2.
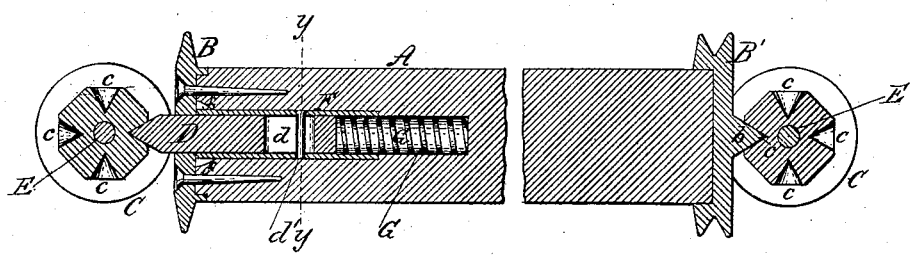
Fig. 3.     Fig. 4.     Fig. 5.
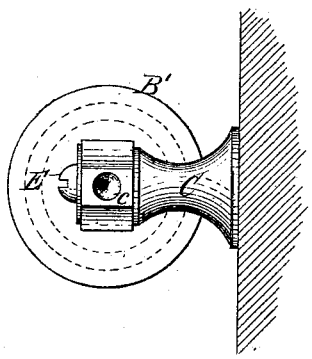 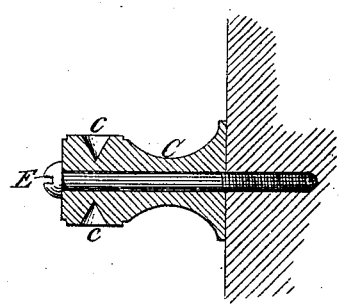 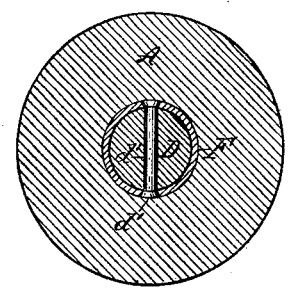
Fig. 6.
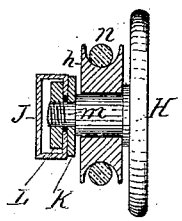
Witnesses
Michael C. Salles
George A. Beyer
Inventor
Alfred Clemons

UNITED STATES PATENT OFFICE.

ALFRED CLEMONS, OF BUFFALO, NEW YORK.

CURTAIN-ROLLER BRACKET.

SPECIFICATION forming part of Letters Patent No. 267,403, dated November 14, 1882.

Application filed June 8, 1882. (No model.)

*To all whom it may concern:*

Be it known that I, ALFRED CLEMONS, a citizen of the United States, residing at the city of Buffalo, in the county of Erie and State of New York, have invented certain new and useful Improvements in Curtain-Fixtures, of which the following is a specification, reference being had to the accompanying drawings, forming a part thereof.

Figure 1 is a front view of my improvement in curtain-fixtures. Fig. 2 is a longitudinal elevation of the same. Fig. 3 is an end view. Fig. 4 is a vertical section on line $x\,x$, Fig. 1. Fig. 5 is a cross-section on an enlarged scale on line $y\,y$, Fig. 2. Fig. 6 is a horizontal section of a cord-tightener.

My improvement consists, first, in the manner in which the brackets C C are constructed and in the fastening of the same; secondly, in the adjustable slotted pivot D and the sleeve or cylinder F, inclosing the same, and their combination with roller A and bracket B in such manner as to make them more perfect and durable than any others heretofore or now in use.

The brackets C C being made octahedral, in each side of which can be made a hole or opening, $c$, for or to receive pointed pivots D $b$ on the ends of roller A, the spiral spring G pressing against the inner end of pivot D, causing the wear of the pivots and pivot-holes always equal and perfect, the pin $d$ running through sleeve F and pivot D, and keeping said pivot from turning in roller A when in operation, the said pivot D having sufficient enchase to move back and forth, as may be required. The brackets C C are fastened to the casings or supports by a single screw, E, running through the center of them into said casings or supports, which holds them in the most substantial manner. The guide-plate or slotted box J of the cord-tightener in Fig. 6 is fastened to the casing by a screw or nail in each end, a thumb or set screw, H, running through the cord-pulley $h$, washer K, and slot in outer side of guide-plate J, and into a sliding nut, L, and by turning said screw brings the said sliding nut L against the inside of the flanges of slotted guide-plate J, and the washer K being pressed against the outer side of the flanges of said guide-plate J, making it perfectly stationary when required. The cord $n$, running from the pulley $h$ to the pulley-flange B′, is tightened or loosened by the operation of the said set-screw H. The above specification will be easily understood by the drawings hereto annexed, and letters of reference, as herein set forth.

What I claim as my improvement is—

The bracket C, constructed with two or more plain faces, and provided in said faces with bearing-recesses for the curtain-roller pintle, as set forth.

ALFRED CLEMONS.

Witnesses:
 MICHAEL C. SALLES,
 GEORGE A. BEYER.